US006889944B2

(12) United States Patent
Brandzel et al.

(10) Patent No.: US 6,889,944 B2
(45) Date of Patent: May 10, 2005

(54) CABLE TO FRAME FASTENER SYSTEM

(76) Inventors: Michael Brandzel, 33 Gardner St., No. 4, Portsmouth, NH (US) 03801; Jeffrey W. Bower, 39 Dearborn St., Portsmouth, NH (US) 03801

( * ) Notice: Subject to any disclaimer, the term of this patent is extended or adjusted under 35 U.S.C. 154(b) by 165 days.

(21) Appl. No.: 10/292,521

(22) Filed: Nov. 13, 2002

(65) Prior Publication Data

US 2003/0089829 A1 May 15, 2003

Related U.S. Application Data

(60) Provisional application No. 60/331,417, filed on Nov. 15, 2001.

(51) Int. Cl.[7] ................................................. F16L 3/08
(52) U.S. Cl. ........................... 248/68.1; 248/65; 248/71
(58) Field of Search ........................... 248/65, 68.1, 73, 248/49, 67.7, 71; 174/65 R, 50

(56) References Cited

U.S. PATENT DOCUMENTS

| 3,186,051 A | * | 6/1965 | Waddell | 24/125 |
|---|---|---|---|---|
| 3,188,030 A | * | 6/1965 | Fischer | 248/68 |
| 3,464,661 A | * | 9/1969 | Alesi, Jr. | 248/68 |
| 3,523,667 A | * | 8/1970 | Guerrero | 248/49 |
| 3,742,119 A | * | 6/1973 | Newman | 174/65 R |
| 3,856,246 A | * | 12/1974 | Sinko | 248/68 |
| 4,306,697 A | * | 12/1981 | Mathews | 248/68 |
| 4,601,447 A | * | 7/1986 | McFarland | 248/49 |
| 4,635,886 A | * | 1/1987 | Santucci et al. | 248/73 |
| 4,801,064 A | | 1/1989 | Mangone, Jr. | |
| 5,104,072 A | | 4/1992 | Kuo et al. | |
| 5,201,484 A | | 4/1993 | Thoen | |
| 5,612,509 A | * | 3/1997 | Market | 174/53 |
| 5,992,802 A | | 11/1999 | Campbell | |
| 6,173,926 B1 | * | 1/2001 | Elvegaard | 248/74.1 |
| 6,378,813 B1 | * | 4/2002 | Gretz | 248/68.1 |
| 6,561,465 B2 | * | 5/2003 | Kondo | 248/74.3 |
| 6,561,466 B1 | * | 5/2003 | Myers et al. | 248/74.4 |

* cited by examiner

Primary Examiner—Leslie A. Braun
Assistant Examiner—Steven Marsh
(74) Attorney, Agent, or Firm—Richard C. Litman

(57) ABSTRACT

A fastener system for securing cable, conduits, pipes, etc., to frames. The fasteners are stackable such that multiple cable may be individually secured in a co-linear route above the wood frame. The system comprises of identical plastic securing blocks, each in the form of a bridge that provides for cables to be nested together, one atop the other. The first or bottom securing block may be nailed or stapled to the wood frame, and the additional fasteners are designed to snap together in a stacked fashion. Several of the plastic securing blocks may be molded together to form a magazine which may be used in an application tool or by hand.

4 Claims, 6 Drawing Sheets

CABLE TO FRAME FASTENER SYSTEM

CROSS-REFERENCE TO RELATED APPLICATION

This application claims the benefit of U.S. Provisional Patent Application Ser. No. 60/331,417, filed Nov. 15, 2001.

BACKGROUND OF THE INVENTION

1. Field of the Invention

The present invention relates to staples. More particularly, the present invention relates to a fastener for securing wire cable, conduits, pipes, tubes, etc., to wooden or metal members.

2. Description of Related Art

It is well known to electricians that securing power cables to wood structural framing members in the traditional way is tedious, awkward, labor intensive, and often hazardous, involving simultaneously holding cables, staples, and a hammer, while on a ladder or scaffold.

The presently used means of securing Type NM or Romex cable to wood framing, as required by electrical code, is to employ staples that are driven manually, using a common carpenter's hammer. Another means presently employed is a plastic strap (also known as a plastic staple) that is secured by one or two nails driven manually or by a hammer. Another means are wire staples applied by a spring-driven staple gun of traditional construction.

Electrical codes sometimes specify that staples must be insulated. Otherwise, the determination of whether such staples may be used remains with local building code enforcement officials.

When running several cables along a common route on a structure, the present practice is to lay such cables side by side. This is impossible in some cases because, when secured, no such cable may be installed closer to each edge of a structural member than 1¼ inches. In certain cases the structural member is not sufficiently wide enough to accommodate more than one cable. This limitation may require additional labor to route extra cables along a different path.

It would be desirable to provide a fastener system for securing wire cable, conduits, tubes, pipes, etc., to wood or metal frames, the fastener being stackable so that multiple cables may be secured in an organized "co-linear" fashion. Particularly desirable would be a fastener system that allows cables to be secured one atop the other. It would be further desirable to provide a fastener system comprised of individual, identical components which may be snapped together during installation. It would also be desirable to provide a fastener system which will secure cables within a range of sizes. It would also be desirable to have a magazine for feeding the fasteners in the fastener system to an appropriate installation tool. It would also be desirable to have a fastener that could be disengaged from one another. It would also be desirable to have a fastener that holds a single cable in an insulated body separate from other cables.

U.S. Pat. No. 5,104,072, issued Apr. 14, 1992, to Kuo, deceased et al., describes an insert-type of dis-engageable underground conduit holder wherein male and female mating sections snap together to hold conduits in a stacked fashion. The holder is made from plastic with semicircular conduit resting portions. The conduit holder is configured to withstand forces placed onto the conduits without separating, while allowing easy disassembly without damage to the remainder of the assembly. The '072 conduit holder is not amenable to installation from a magazine-loaded installation tool.

U.S. Pat. No. 5,612,509, issued Mar. 18, 1997, to Market, describes a stackable wire staple and raceway system in a strap configuration for securing conductive cabling to a variety of surfaces. The base portion has apertures for receiving nails to secure the first cable fastener to a surface while the attachable fasteners have several ribbed protrusions for insertion into bores made into each fastener so that the fasteners can be stacked on atop the other. The '509 fastener system does not provide a configuration for installation from a magazine-loaded installation tool.

U.S. Pat. No. 5,992,802, issued Nov. 30, 1999, 1 to Campbell, describes a cable support for parallel runs of coaxial cable made up of pairs of molded plastic blocks stacked on a single threaded rod. The identical blocks have semicircular, cylindrical recesses which cooperate to provide circular, cable-gripping passages in a stacked relationship with all the blocks being fastened together by a single threaded rod or bolt that passes directly through their respective centers. The '802 fastener support system is not amenable to installation from a magazine-loaded installation tool.

U.S. Pat. No. 5,201,484, issued Apr. 13, 1993, to Thoen describes a stacking cable clamp for stacking electrical cable in a stacked relationship, comprising a base clamp that is secured to wood via nails. Additional clamps are secured atop the base clamp via ears that engage slots on the additional clamps. The '484 clamp system does not provide a configuration for installation from a magazine-loaded installation tool.

U.S. Pat. No. 4,801,064, issued Jan. 331, 1989, to Mangone, Jr., et al, describes interlocking adjacent clips for mounting cable to wood which are provided in a group for filling a magazine for an applicator machine, to be individually dispense thereby for nailing by a staple-like installation tool. The '064 clip system is not stackable, thus, not providing mounting for more than a single cable along the same wooden frame.

None of the above inventions and patents, taken either singly or in combination, is seen to describe the instant invention as claimed.

SUMMARY OF THE INVENTION

The present invention is a fastener system for securing wire cable, conduits, tubes, pipes, etc., to wood or metal frames. The fasteners in the fastener system are stackable such that multiple cables may be secured individually in a co-linear route above the wood frame. The system comprises of identical plastic elements in the form of a bridge that provides for cables to be nested, secured, and organized together, one atop the other. The first or base unit may be nailed, stapled, screwed, or glued to the wooden or metal frame, and the additional fasteners are designed to snap together in a stacked fashion in order to conserve space, time, and to locate wire, cable, conduits, tubes, etc. in a central location. Several of the plastic elements may be molded together to form a magazine which may be used in a mechanized application tool or by hand.

Accordingly, it is a principal object of the invention to provide a stackable fastener system such that multiple cables may be secured individually in an organized "co-linear" manner.

It is another object of the invention to provide a fastener system that allows cables to be secured one atop the other.

It is a further object of the invention to provide a fastener system comprised of identical components which may be snapped together during installation.

It is yet another object of the invention to provide a fastener system as above which is capable of securing cable within a range of sizes.

Still another object of the invention is to provide a fastener system having a magazine for feeding the fasteners with an application tool for manual and mechanical installations.

It is yet another object of the invention to provide an aligning element for the individual staples to be stacked properly without any damage to the cable.

Still another object of the invention to provide an element that applies equal and adequate pressure to the various cables that are being held by the staple.

It is yet another object of the invention to provide a fastener that can be disengaged for removing, relocating and upgrading future wire, cable conduits, tubes, pipes, etc.

Still another object of the invention is to provide a fastener that securely and safely holds one wire, etc. at a time in an isolated and insulated manner.

It is yet another object of the invention to provide a system that insures that cables, etc. are fastened in a manner such as to prevent any possible damage due to excessive force when attached to wooden members.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a fastener system for securing wire cable, conduits, tube, pipes, etc. of a generally circular or oval cross section to wood or metal frames. The fasteners in the fastener system are stackable such that multiple cable may be organized individually in a safe and secure fashion in a co-linear route on the wooden frame. The system comprises of identical plastic securing units in the form of a bridge that provides for cables to be secured together, one atop the other. The first or base bridge element may be nailed, glued, or stapled to the wood frame or screwed or glued to a metal frame, and the additional fasteners are designed to snap together in a stacked fashion. A magazine of the fasteners for installation by hand or special tool is provided by the present invention.

Figure 1A:
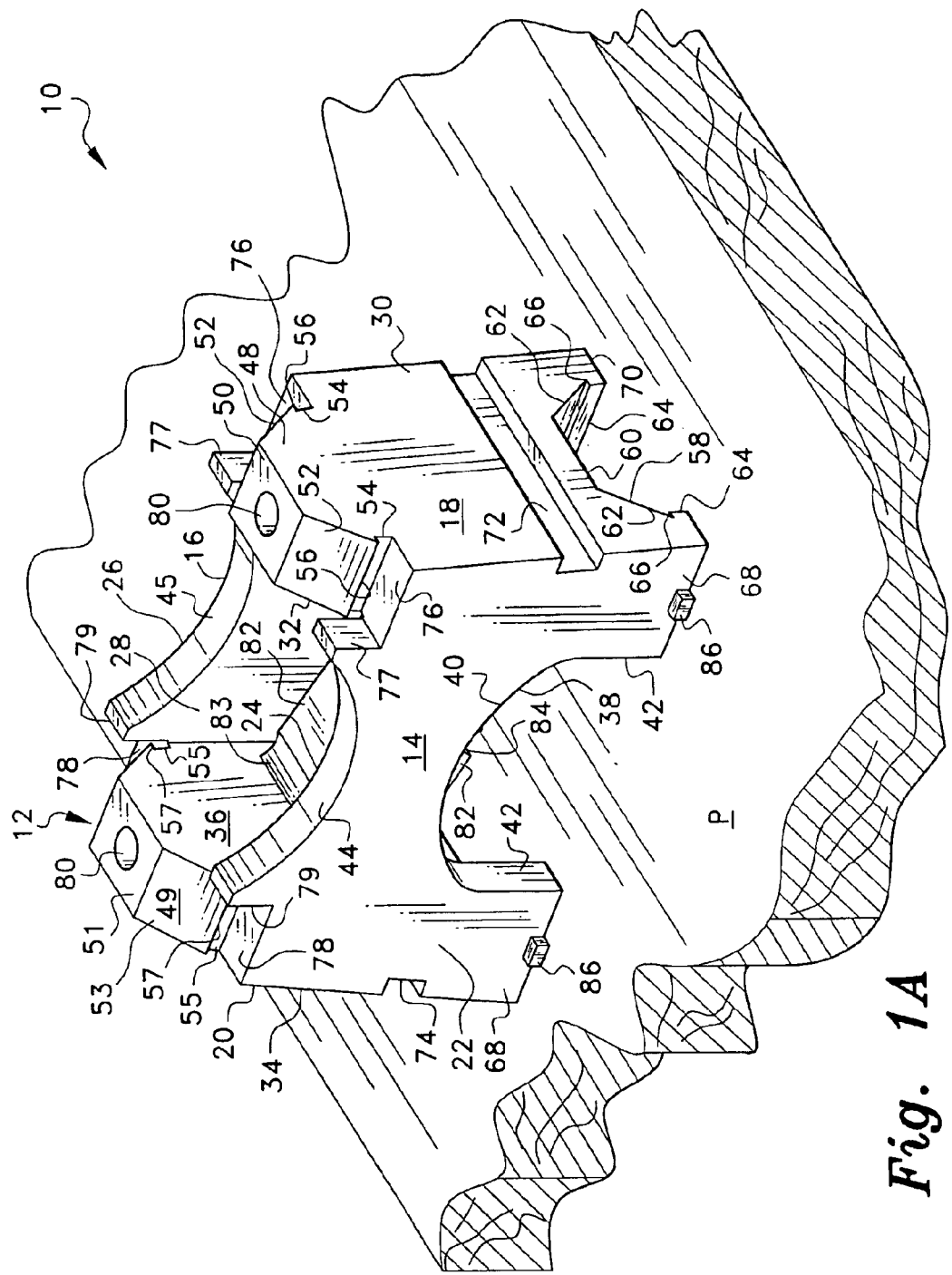
FIG. 1A is an environmental, perspective view of a fastener element for securing cable to wood frame according to the present invention.
Figure 1B:
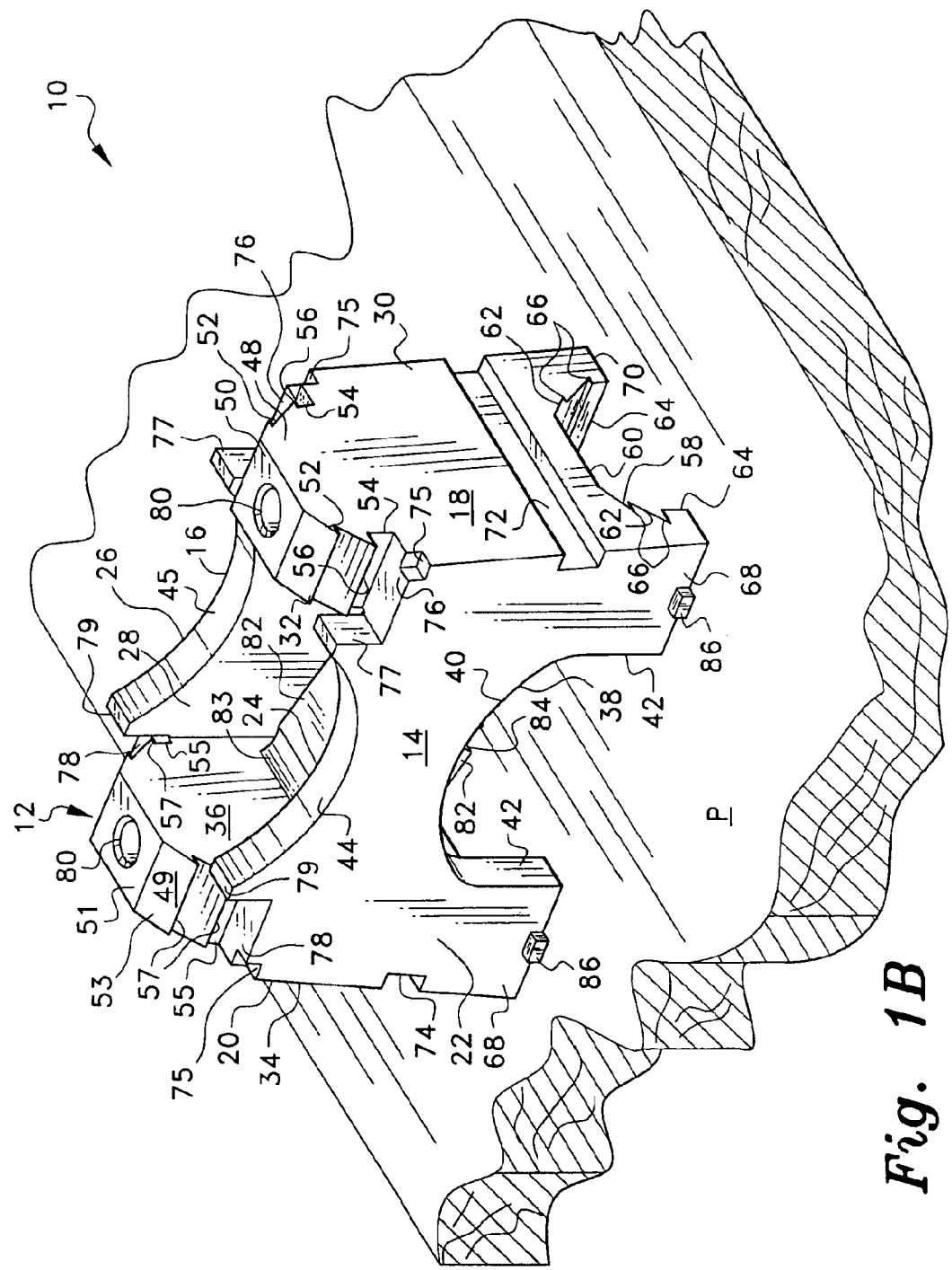
FIG. 1B is a view as in FIG. 1A of another embodiment of the present invention.
Figure 2:
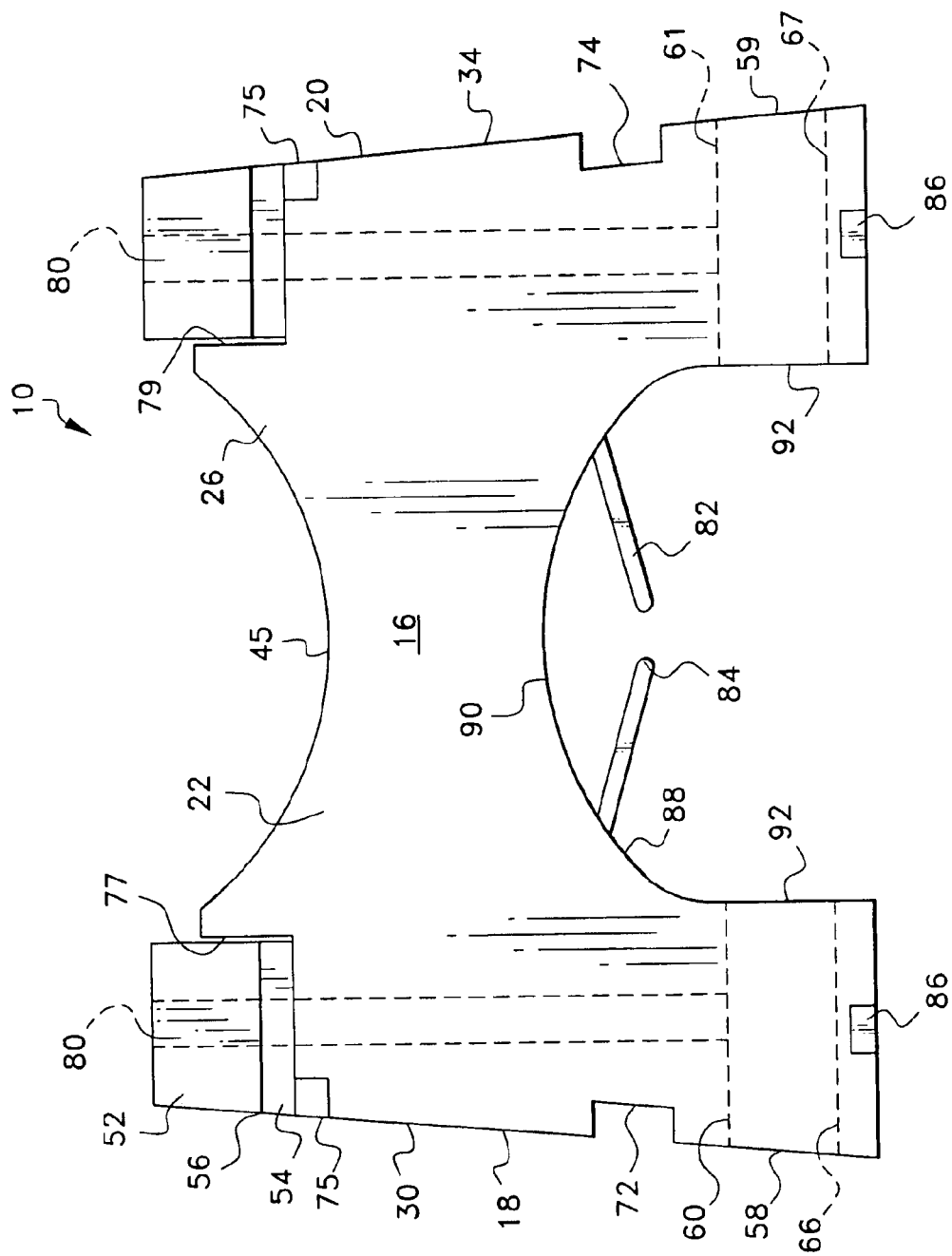
FIG. 2 is an elevational rear face view of the fastener element of FIG. 1B.

Referring to FIGS. 1A, 1B, and 2, there are shown an environmental perspective view and a back view in elevation, respectively, of the cable mounting system, generally denoted 10 which includes cable securing block 12 which is in the general shape of a topless and bottomless box, tapered slightly wider at the bottom than at the top, having first face wall 14, second face wall 16 opposite first face wall 14, first side wall 18 and second side wall 20 opposite first side wall 18. First face wall 14 has a first face wall outer surface 22 and a first face wall inner surface 24. Second face wall 16 has second face wall outer surface 26 and a corresponding second face wall inner surface 28. First side wall 18 has first side wall outer face 30 and first side wall inner face 32. Second sidewall 20 has second sidewall outer face 34 and second sidewall inner face 36.

First face wall 14 defines first portal 38, which is open at the bottom and having first portal arch 40 facing downward from an apex and first portal sides 42 extending downward from portal arch 40. First face wall 14 also defines first support arch 44 opening upward and forming its upper edge. Second face wall 16 defines second support arch 45 opening upward, and forming its upper edge.

First side wall 18 defines first tongue 48, forming its upper edge. Second side wall 20 defines second tongue 49, forming its upper edge. First tongue 48 includes first tongue upper surface 50, generally flat and perpendicular to first sidewall 18, first tongue sloping surfaces 52, sloping downward and away from first tongue upper surface 50, and first tongue retaining grooves 54 at the base of first tongue 48 and forming first tongue retaining groove lip 56 with the lower edge of first tongue sloping surfaces 52, respectively. It is noted that in the FIG. 1A there is shown an embodiment having dual tongue sloping surfaces 52, dual tongue retaining grooves 54, and two retaining groove lips 56 per tongue side of first tongue 48.

Second tongue 49 includes second tongue upper surface 51, generally flat and perpendicular to second sidewall 20, second tongue sloping surfaces 53, sloping downward and away from second tongue upper surface 51, and second tongue retaining grooves 55 at the base of second tongue 49 and forming second tongue retaining groove lip 57 with the lower edge of second tongue sloping surfaces 53, respectively. It is noted that in the FIG. 1A there is shown an embodiment having dual tongue sloping surfaces 53, dual tongue retaining grooves 55, and two retaining groove lips 57 per tongue side of second tongue 49.

First side wall 16 defines first tongue receiving groove 58 which forms the lower edge of first side wall 18 and includes first tongue receiving groove upper surface 60 which is generally flat and perpendicular to first sidewall 18, first tongue receiving groove sloping surfaces 62 sloping downward to first tongue receiving groove projection 64 and forming first tongue retaining groove lip retainers 66. It is noted that in the FIG. 1A there is shown an embodiment wherein first tongue receiving groove 58 has dual sloping surfaces 62, dual receiving groove projections 64, and dual retaining groove lip retainers 66 per side of first tongue receiving groove 58.

Second side wall 20 defines a second tongue receiving groove 59 (see FIG. 2) similar to that of first side wall 18 and having second tongue receiving groove upper surface 61 and second tongue retaining groove lip retainer 67. It is noted that the embodiment of FIG. 1B there are corresponding dual receiving grooves, and dual retaining groove lip retainers (not shown) identical to those formed by the first tongue receiving groove 59.

First portal 38, first tongue receiving groove 58 and the second tongue receiving groove 59 (see FIG. 2) form first face support legs 68. Second face support legs 70 are similarly formed by second portal 88 and having arch 90 and sides 92 (see FIG. 2), first tongue receiving groove 58 and the second tongue receiving groove 59. First sidewall 18 features first side wall alignment groove 72, spaced above first tongue receiving groove 58 and horizontally disposed. Second side wall 29 similarly features second sidewall alignment groove 74 horizontally disposed and similarly spaced above the second tongue receiving groove 59. First sidewall leg support faces 76 are horizontal, planar upper surfaces, bounded by first face locating walls 77 and first tongue retaining grooves 54. Similarly, second sidewall leg support faces 78 are horizontal, planar upper surfaces, bounded by second face locating walls 77 and second tongue retaining grooves 55. The embodiment of FIG. 1B second tongue receiving groove 59 (not shown) has similar dual sloping surfaces, groove projections and retaining groove lip retainers as in the first tongue receiving groove 58.

Fastener vertical bores 80 extend downward from first tongue upper surface 50 to first tongue receiving groove upper surface 60, and from second tongue upper surface 51 to second tongue receiving groove upper surface 61. Bores 80 are configured to receive fasteners F (see FIG. 3) such as nails. The bores may bay be counter sunk in a well-known manner so as to receive the nail heads within the bores 80.

Tensioning fingers 82 are attached at side wall attachment points 83 located horizontally along first side wall inner face 32 and second sidewall inner face 36, respectively, and are centrally spaced at free ends 84, said tensioning fingers slanting downward from said first and second inner faces 32 and 36, respectively in line with a cable C (see FIG. 3) so as to hang below portal arches 40 and 90 and align and bear downward against the cable C.

Figure 4:
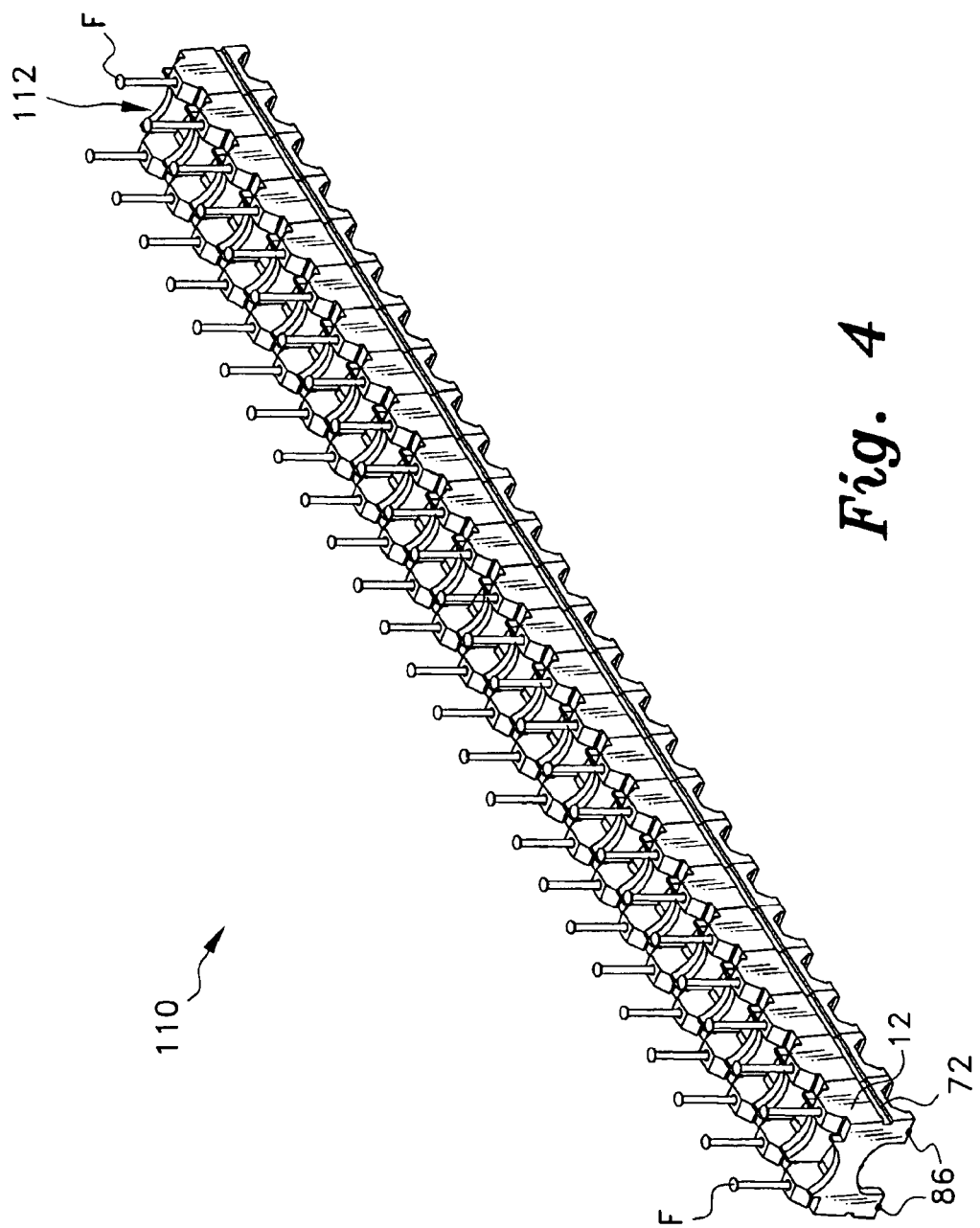
FIG. 4 is a perspective view of a group of fastener elements as in FIG. 1 for use in the application of the fastener elements to a wood frame.
Figure 5:
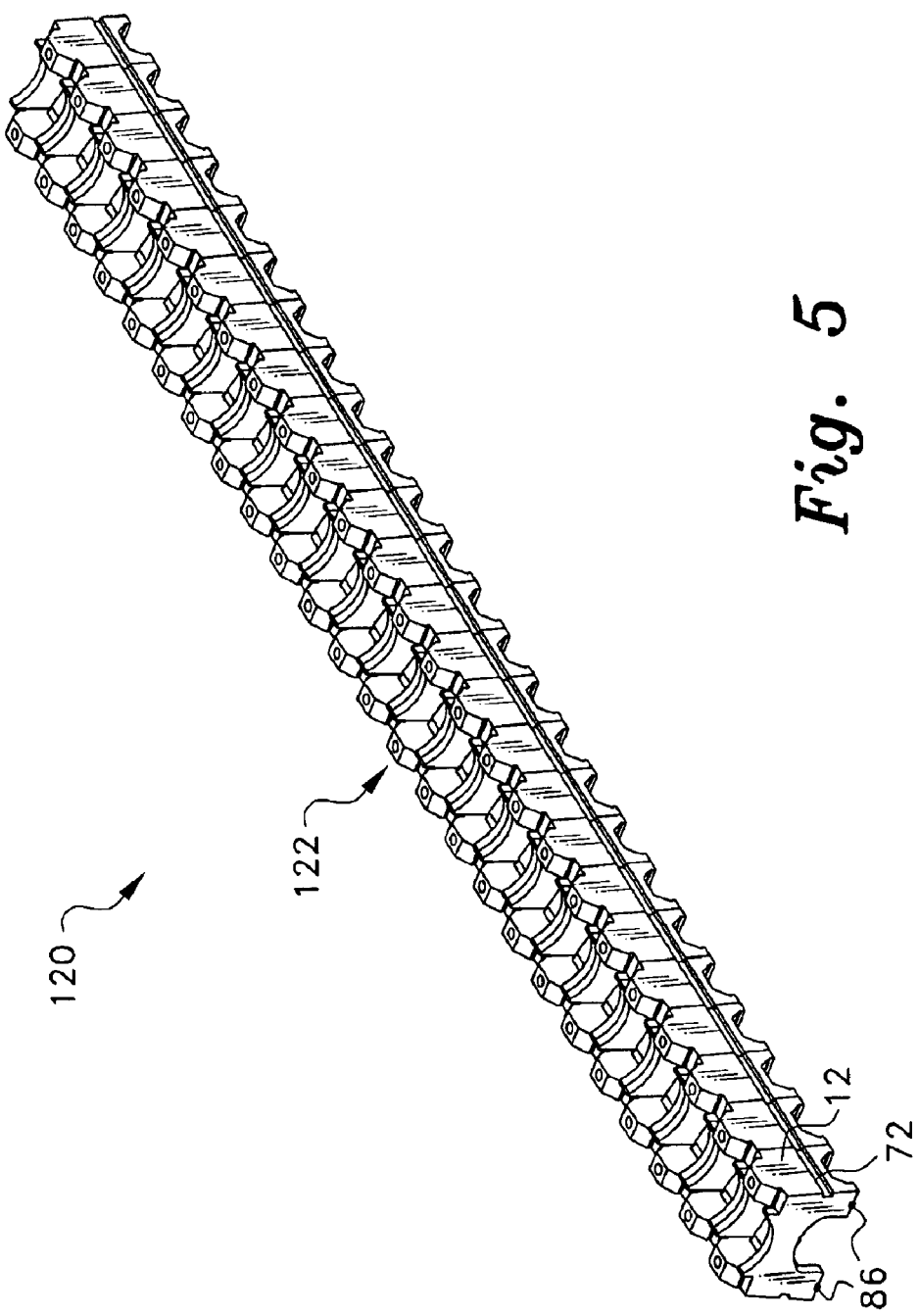
FIG. 5 is a perspective view of a group of fastener elements as in FIG. 3, useful within a magazine of an application tool.

Block attachment teats 86 are located on legs 68 and 70 to allow the shearable attachment of several securing blocks face to face (see FIGS. 4 and 5).

Figure 3:
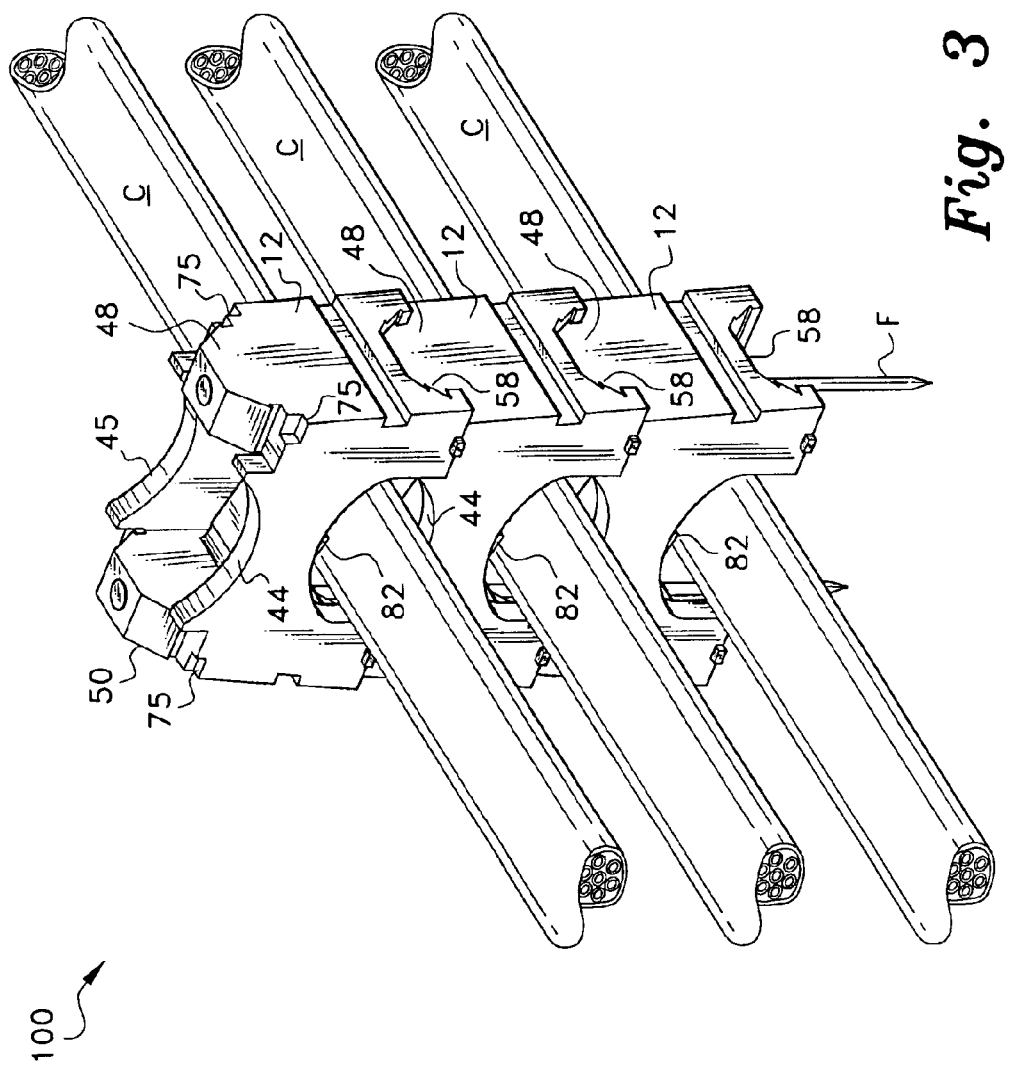
FIG. 3 is a perspective view of a stack of fastener elements as in FIG. 1B securing multiple cables.

Referring to FIG. 3, there is shown a cable support stack support assembly 100, wherein stacked securing blocks 12 support cables C. As can be seen, the lower block 12 is attached by fasteners F around a lower cable C to a wood plank P (see FIG. 1). Grooves 58 of the next upper block are locked over tongues 48. Support arches 44 and 45 support upper conduits C while elastic clips 82 align and bear against the upper sides of cables C. In this manner a stack of any desired number of cables may be supported by interlocked securing blocks 12. As seen in FIGS. 1B, 2, and 3, corner tool receivers 75 are located at the upper intersections of each side wall 18,20 and face wall 14,16 to enable the insertion of a prying tool (not shown) for separating each interlocked securing block 12.

Referring to FIG. 4, there is shown fastener securing block magazine supply system 110 having fastening block magazine 112 comprising a group of cable securing blocks held face to face by teats 86, each securing block 12 having fasteners F ready for driving into a wood plank P (see FIG. 1). Alignment grooves 72 and 74 (see FIG. 1) are aligned with each other along securing blocks 12.

In operation, portals 38 and 88 of securing block 12 are centered over cable C and pressed downward until legs 68 and 70 rest on frame or plank P. Tensioning fingers 82 engage cable C along their free ends 84. Fasteners F, such as nails, are driven through bores 80 and into frame or plank P, thus securing cable C to plank P. As seen in FIG. 4, a group of 25 to 50 securing blocks may be formed face to face and attached by teats 86 to form a magazine which may be placed in an installation tool which aligns along alignment grooves 72 and 74 and drives fasteners F into the frame or plank P. In this process, the teats 86 are sheared to sequentially free each securing block 12 during the fastening process. The magazine of attached securing blocks 12 may also be helpful for manual installation. Generally, a number of spaced securing blocks 12 are required for securing cable C along its length.

If it is desired to stack cables C (see FIG. 3), the upper cables of the stack are rested in turn over arch supports 44 and 45 and secured by portals 38 and 88 and tensioning fingers 84 as the cables C are laid and securing blocks 18 are stacked. Any desired number of cables C may be installed by this procedure, there being a requirement only that there is one more securing block 12 than cables C. No fasteners F are required for the attachment of stacked securing blocks 12. Securing blocks 12 are securely attached by snapping tongue receiving grooves 58 and 59 over respective tongues 48 and 49 of the next lower securing block such that tongue retaining groove lips 56 and 57 become lodged in tongue retaining groove lip retainers 66 and 67. Legs 68 and 70 then rest on leg support faces 76 and 78 of the next lower securing block 12 face locating walls 77 and 79, acting against side wall inner faces 32 and 36 of the next lower securing block 12 and maintaining protection against lateral movement of the blocks relative to each other. A prying tool (not shown) may be inserted in corner tool receivers 75 for prying apart blocks 12 when disassembly is desired.

As seen in FIG. 5, a group of 25 to 50 securing blocks 12 may be formed face to face and attached by teats 86 to form a magazine which may be placed in an installation tool which aligns along alignment grooves 72 and 74 and drives tongues 48 and 49 into respective tongue receiving grooves 58 and 59, respectively. In this process, the teats 86 are sheared to free each securing block 12 during the stacking process. The magazine of attached securing blocks 12 may also be helpful for manual installation.

The inventive block or magazine is preferably made of an impact resistant polymer material such a Delron Nylon 6-6 and secured in place by nails or with an adhesive. The preferred nails are of the ring-shank type, enhancing the holding power of the fastener. Stacked blocks require no nails. A wire or sheet metal staple could be adapted to serve the function of the two nails in the installation of the inventive securing blocks on wooden frames.

The portals of the inventive securing block are of sufficient size for the maximum cable size. A typical cable to be secured is Type NM-B 12-2. The inventive securing blocks may be applied to secure any cable such as control, telephone, video, or fiber optics cables. The block and portals may be of any desired size for installation of larger or smaller cables as required. Also, additional grip for smaller cables (Type NM-B 14-2) is supported by the tensioning fingers that are a molded, integral feature of the inventive securing block.

It is to be understood that the present invention is not limited to the sole embodiment described above, but encompasses any and all embodiments within the scope of the following claims.

We claim:

1. A stackable securing system for fastening power and similar cables of generally circular cross section to a frame comprising:

a) a first securing block having a generally box-shaped body and having first and second face walls having respective inner faces, first and second side walls having respective inner faces, and upper and lower ends, said upper and lower ends being open;

b) said first and second face walls each defining first and second portals opening downward, wherein each portal has an apex and first and second support arches opening upward, respectively;

c) said first and second side walls each having a tongue projecting upward and defining corresponding tongue receiving grooves opening downward, respectively, wherein each said tongue includes a generally flat upper surface, opposing downwardly sloping surfaces terminating in lower edges, said tongue receiving grooves forming retaining groove lips with the lower edges of said tongue sloping surfaces;

d) a horizontally disposed alignment groove disposed in each sidewall and spaced below its respective tongue receiving groove;

e) said first and second side walls each defining a vertical bore extending therethrough, each said bore entering and extending downward through said tongue and exiting below each said horizontally disposed alignment groove respectively;

f) said first and second portals being configured as to receive a cable oriented generally normal to said first and second face walls;

g) a fastener corresponding to each said vertical bore, said first and second portals securing said cable upon driving said fasteners through said vertical bores and into said frame;

h) plural tensioning fingers extending inward and downward from each said side wall inner face and so located as to slant inward and extend below the apex of said portals of said face walls, wherein said tensioning fingers horizontally extend the length of their respective side wall inner face so as to align and bear against a cable held thereby.

2. The stackable securing system of claim 1, further comprising a second identical securing block stackable on said first securing block and secured thereto, the portals of said second securing block securing a second cable against said first and second support arches of said first securing block.

3. The stackable securing system of claim 1, wherein said first and second sidewalls each have additional tongue receiving grooves spaced below said corresponding tongue receiving grooves.

4. The stackable securing system of claim 1, further comprising a plurality of said securing blocks and shearable teats attaching said blocks in face to face relationship.

* * * * *